United States Patent [19]
Miller, Jr. et al.

[11] Patent Number: 4,612,051
[45] Date of Patent: Sep. 16, 1986

[54] WATER-BASED PRINTING INK COMPOSITIONS CONTAINING A LIGNIN ACETATE BINDER

[75] Inventors: James E. Miller, Jr., Mt. Pleasant; Peter Dilling, Isle of Palms, both of S.C.

[73] Assignee: Westvaco Corporation, New York, N.Y.

[21] Appl. No.: 756,179

[22] Filed: Jul. 18, 1985

[51] Int. Cl.[4] ............................................. C09D 11/02
[52] U.S. Cl. .................................. 106/30; 106/123.2; 106/241
[58] Field of Search ...................... 106/30, 241, 123.2

[56] References Cited

U.S. PATENT DOCUMENTS 2,449,230  9/1948  Irion ...................................... 106/30

Primary Examiner—Amelia B. Yarbrough
Attorney, Agent, or Firm—Terry B. McDaniel; Richard L. Schmalz

[57] ABSTRACT

An improved water-based printing ink composition comprising, in aqueous medium, a colorant selected from the group consisting of a dispersed dye, a pigment, and mixtures thereof; and a water-insoluble non-sulfonated lignin acetate binder for the colorant. Also disclosed is a method of producing the improved water-based printing ink composition by reductively acetylating a non-sulfonated lignin to form a lignin acetate, drying the lignin acetate, and combining the dried lignin acetate in aqueous medium with a printing ink colorant.

5 Claims, 1 Drawing Figure

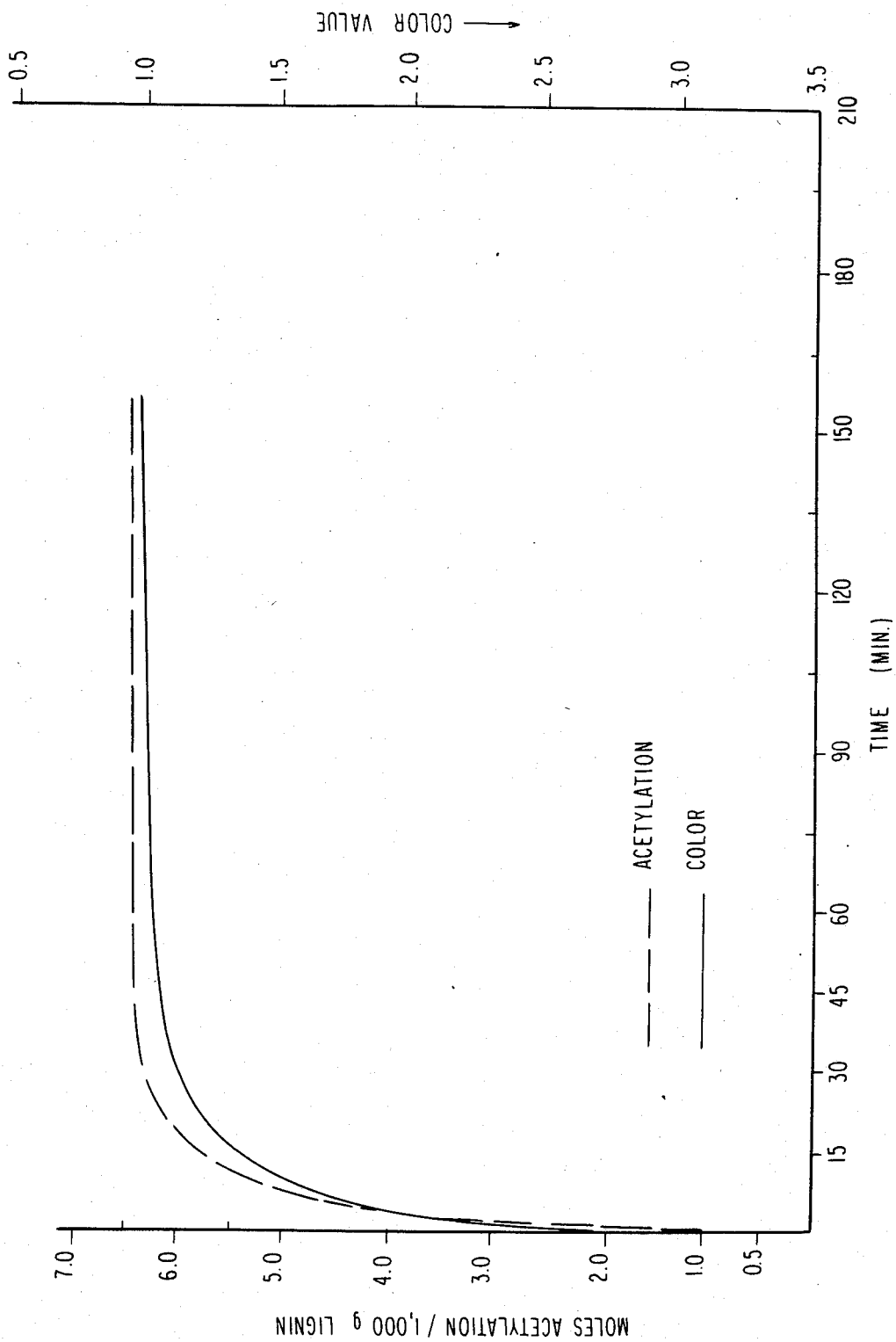

WATER-BASED PRINTING INK COMPOSITIONS CONTAINING A LIGNIN ACETATE BINDER

The present invention is directed to an improved flexographic printing ink composition and, more particularly, to an improved water-based flexographic printing ink composition containing an ink colorant and a water-insoluble lignin acetate compound as a binder and carrier therein. The invention also relates to a method of producing such improved water-based printing ink compositions.

BACKGROUND OF THE INVENTION

A large and fast growing area in the field of printing is known as flexography or flexographic ink printing. Flexographic ink printing is a branch of the rotary typographic printing in which the printing is applied to a print-receiving substrate by use of a flexible relief plate with highly fluid, volatile inks which dry rapidly by evaporation. The process was orginally limited to printing paper bags but many inroads have been made in recent years to extend the process to printing various flexible packaging, textiles, newsprint, and other print-receiving substrates.

A flexographic printing ink generally contains three basic types of ingredients denominated as a solvent, a colorant, and a binder. Minor amounts of other additives also may be employed to provide the desired rheology, viscosity, etc. for the printing ink composition.

In recent years, increased emphasis has been placed on the use of water as the solvent, rather than an oil-based solvent. As colorants, dispersed dyes, pigments, or combinations of the two generally are employed.

The binder component of the printing ink composition generally comprises a resin which functions primarily to increase adhesion of the pigment to the substrate, and also often act as a dispersing medium and carrier. Binders heretofore used in water-based printing ink compositions have included acrylic resins. Amine salts of lignins also have been employed as binders in water-based, carbon black colorant Because acrylic resins are relatively slow drying, their use as binders creates a tackiness, or stickiness, of the printing ink and a material buildup on the second and subsequent impression roll of the printing press, necessitating periodic shutdown for cleaning of the printing equipment with resultant lost time in commercial operations. Although lignin amine salts have reduced tackiness and stickiness as compared to the acrylic resins, their dark color precludes their use in lighter colorant shades, other than the carbon black inks.

Minor amount additives in the printing ink compositions generally may comprise surfactants, slip agents, catalysts, and rheology control agents. Typical surfactants are organic sulfonates, whiles waxes serve as slip agents. Drying agents may comprise lead-derived drying oils, while clays and certain high molecular weight polymers may be employed to control the rheology of the ink composition.

OBJECTS OF THE INVENTION

It is an object of the present invention to provide an improved water-based printing ink composition containing an ink colorant and, as a binder therefor, an improved light-colored lignin acetate.

It is another object to provide an improved water-based printing ink composition having improved color and good print ink-binding characteristics.

It is a more specific object to provide a water-based printing ink composition containing a lignin acetate binder to provide improved color of the print ink with reduced surface tack in application to a print-receiving substrate.

It is a further object to provide a method of producing an improved water-based printing ink composition containing a colorant and a lignin acetate binder having reduced color interference with the printing ink colorant.

BRIEF SUMMARY OF THE INVENTION

The present invention comprises a water-based flexographic printing ink composition having improved color and reduced tack in application, comprising, in aqueous medium, a colorant selected from the group consisting of a dispersed dye, a pigment, and mixtures thereof, and a binder comprising a water-insoluble, non-sulfonated lignin acetate compound of reduced color.

BRIEF DESCRIPTION OF THE DRAWING

The above as well as other objects of the present invention will become more apparent, and the invention will be better understood from the following detailed description of preferred embodiments there, when taken in connection with the drawing FIGURE which is a graphic presentation of the color values of lignin acetate compounds of differing degrees of acetylation.

DETAILED DESCRIPTION OF PREFERRED EMBODIMENTS

As stated above, the printing ink composition of the present invention comprises, in aqueous medium, an ink colorant selected from the group consisting of a dispersed dye, a pigment, and mixtures thereof. Typical of the many colorants which may be employed in the printing ink composition are: Diarylide Yellow, Phthalo Blue, and Barium Lithol Red.

As the binder to secure the ink colorant to the print-receiving substrate, e.g., paper, the present invention employs lignin acetate. Such compounds may be produced from the lignin by-products of a kraft pulping process of a paper-making operation. Lignin is recovered from the waste black liquor of a kraft pulping process by reducing the pH of the black liquor from a pH of around 13.5 to a pH of about 9.5 to precipitate the lignin. The lignin precipitate is thereafter further acidified to an acidic pH level where it is recovered and water-washed to remove inorganic salts and other impurities. Such methods of recovery of lignin by-products from kraft pulping processes and their purification is described in U.S. Pat. No. 4,381,194.

Because of the noticeable color of such lignins and the detrimental interference that the lignin color has, particularly on lighter primary colorants, they have not been satisfactorily employed in the lighter color printing ink systems. In attempting to reduce or eliminate the color of lignin for use as a binder in water-based printing ink systems, a logical choice is to oxidatively bleach the non-sulfonated kraft lignin. However, the increased carboxyl content of such bleached lignins increases their water-solubility to an extent that that they are unsatisfactory for use as a binder for the colorant in a water-based printing ink system. Attempts to formulate and use an ink composition at an acidic pH level to reduce the lignin water-solubility causes corrosion of the printing equipment.

It has now been found that lignin acetate may be employed effectively as a binder without color interference, and in many cases with color enhancement of the primary color, in water-based printing ink compositions. Such lignin compounds are produced by reductive acetylation of a non-sulfonated lignin by treatment with acetic anhydride used as a solvent and acetylating agent, and zinc dust used as a reducing agent. The resulting reaction reduces the color-producing quinone-type groups or structures of the lignin molecule to reactive hydroxyl groups which in turn react with the solvent/reactant acetic anhydride to yield lignin acetate. The reaction steps of the process are illustrated by the following chemical equation:

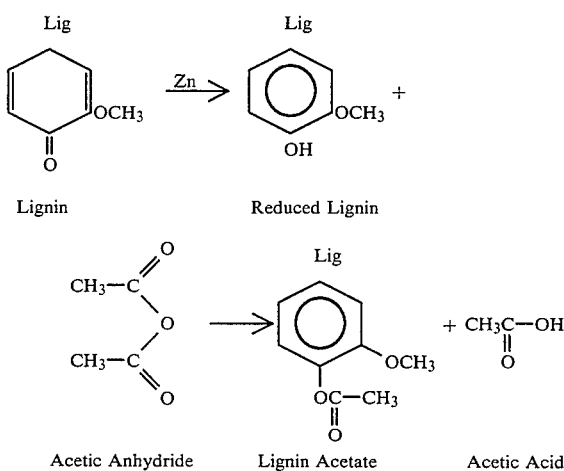

Not only are the primary color bodies of the lignin destroyed, but they are protected from re-oxidation by blocking the intermediate phenolic compounds by simultaneous acetylation. Additionally, the normally occuring phenolic and aliphatic hydroxyls of the lignin compound are stabilized, inhibiting the formation of heavy metal complexes. Although the resulting lignin acetate product has a pale yellow color, it is quite acceptable for use as an ink binder. In fact, the lignin acetate binder has been found to provide enhancement in the dye colorant which enables production of a richer, fuller color on the printed substrate with less use of principal colorant in the print composition.

The invention may be further described and explained by the following specific example illustrating the preparation and use of lignin acetate as a binder in a water-based printing ink composition. Amounts given are by weight unless otherwise indicated.

EXAMPLE

A non-sulfonated lignin by-product of a kraft pulping process is recovered from the black liquor residue by treatment of the black liquor with carbon dioxide to lower the pH from 13.5 to about 9.5 to precipitate the lignin. The precipitated lignin slurry is then acidified by the addition of sulfuric acid to an acid pH level, where it is recovered and washed with water to remove inorganic salts and other impurities. The non-sulfonated precipitated lignin is spray-dried to a moisture content of approximately 4 to 5%.

One hundred pounds of acetate anhydride is placed in a clean, dry esterification reactor. Agitation is begun and the temperature in the reactor raised to 175° F. Fifty pounds of the dried lignin is added slowly to the reactor with agitation. The temperature of the reactor is raised to 212° F. and another 30 pounds of the lignin is added slowly, avoiding lumps. Eight pounds of zinc dust (10% by weight based on the weight of the lignin) is then added and the esterification reactor tightly capped.

The reactor temperature is raised to 250° F. and maintained for two hours. The reactor pressure is maintained at atmospheric throughout the reaction. At the end of the reaction, the reactor temperature is reduced to 212° F. and the product pumped into an agitated tank containing 250 pounds (approximately thirty gallons) of water. Agitation is continued until the lignin acetate is completely dispersed in the water.

The lignin acetate slurry is then filtered and washed to a final conductivity of less than 100 micro mhos. A 40% to 50% solids lignin acetate cake is obtained, transferred to a dryer and dried to a final moisture content of less than 10%.

The color value of the lignin acetate was calculated by obtaining an absorbence reading, at 500 nm, of a 1% lignin acetate solution in a 90/10 dimethyformamide/water system. The reading was taken on a Beckman DK-2A spectrophotometer.

The dried lignin acetate product, which had a color value of approximately 1.0 and a very pale yellow color, is subsequently added to an aqueous printing ink composition, typically having the following formulation:

| INGREDIENT | AMOUNT, BY WEIGHT |
| --- | --- |
| Colorant (Phthalo Blue) | 10-16% |
| Binder (lignin acetate) | 8-18% |
| Dispersant/wetting agent (naphthalene sulfonate) | 1-2% |
| Filler (kaolin) | 1-6% |
| Defoamer (ethyoxylated acetylence alcohol) | 0.3-0.5% |
| Thickener (carboxymethyl cellulose) | 0.14-0.20% |
| Water | remaining to 100% |

The printing composition containing the principal colorant and the water-insoluble lignin acetate is formulated and applied in a flexographic printing operation to a paper substrate. The resulting printed substrate exhibits excellent print colorant qualities with enhancement of the color of the major colorant by use of the lignin acetate salt.

In preparation of printing compositions of the present invention, the color value of the lignin acetate is preferably about 1.0 or less. To obtain such color reduction, is has been found desirable to use at least about 10% by weight of zinc and to carry out the acetylation reaction for a period of about 30 minutes or more. For best color reduction, it also preferable to utilize a lignin by-product starting material having a moisture content of no more than about 5%.

The relationship between the color of the acetylated lignin and the degree of acetylation is illustrated in the graph of the drawing. As can be seen, a reaction period of approximately 30 minutes to produce approximately 6 moles of acetylation per 1000 grams of lignin results in a color value of approximately 1.0 or less.

That which is claimed is:

1. An improved water-based printing ink composition comprising, in aqueous medium, a colorant selected from the group consisting of a dispersed dye, a pigment, and mixtures thereof; and a water-insoluble non-sulfonated lignin acetate binder for the colorant.

2. A method of producing an improved water-based printing ink composition having improved color in application comprising the steps of:
   (a) providing a water-insoluble non-sulfonated lignin;
   (b) reductively acetylating the non-sulfonated lignin to form a lignin acetate compound of reduced color content;
   (c) subjecting the resultant lignin acetate to a drying step; and
   (d) combining the dried lignin acetate, in aqueous medium, with a printing ink colorant selected from the group consisting of a dispersed dye, a pigment, and mixtures thereof.

3. A method as defined in claim 2 wherein the water-insoluble non-sulfonated lignin is dried to a moisture content of less than about 5%.

4. A method as defined in claim 3 wherein the lignin acetate is formed by reacting the lignin with acetic anhydride and zinc at elevated temperatures to reductively acetylate the same and reduce the color content of the lignin.

5. A method as defined in claim 4 wherein the acetylation reaction employs about 10% by weight of zinc based on the weight of the lignin and is carried out at elevated temperatures for a period of about 30 minutes or more to obtain the color reduction of the lignin.

* * * * *